Aug. 14, 1951     F. R. HAMANN ET AL     2,563,930
LIQUID MEASURING AND DISPENSING DEVICE
Filed Feb. 17, 1948     2 Sheets-Sheet 1
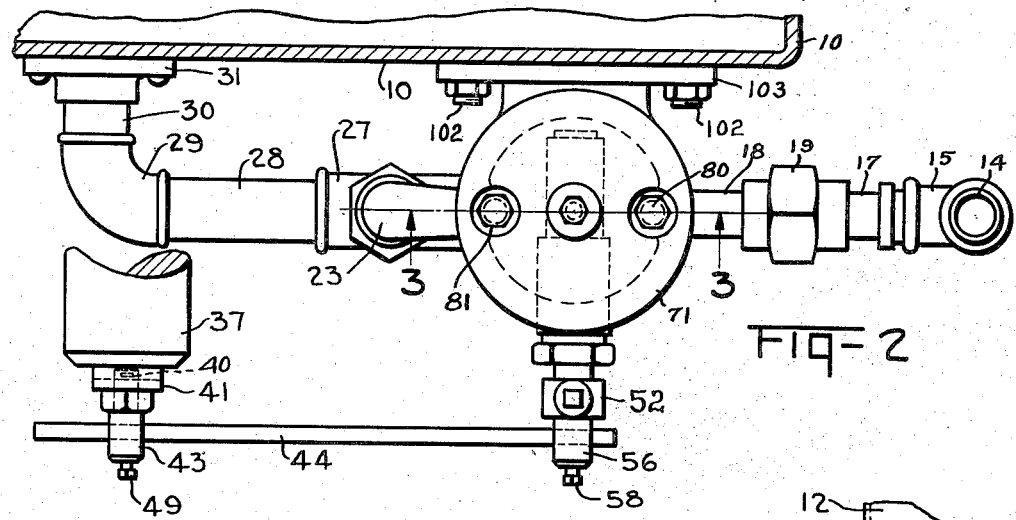
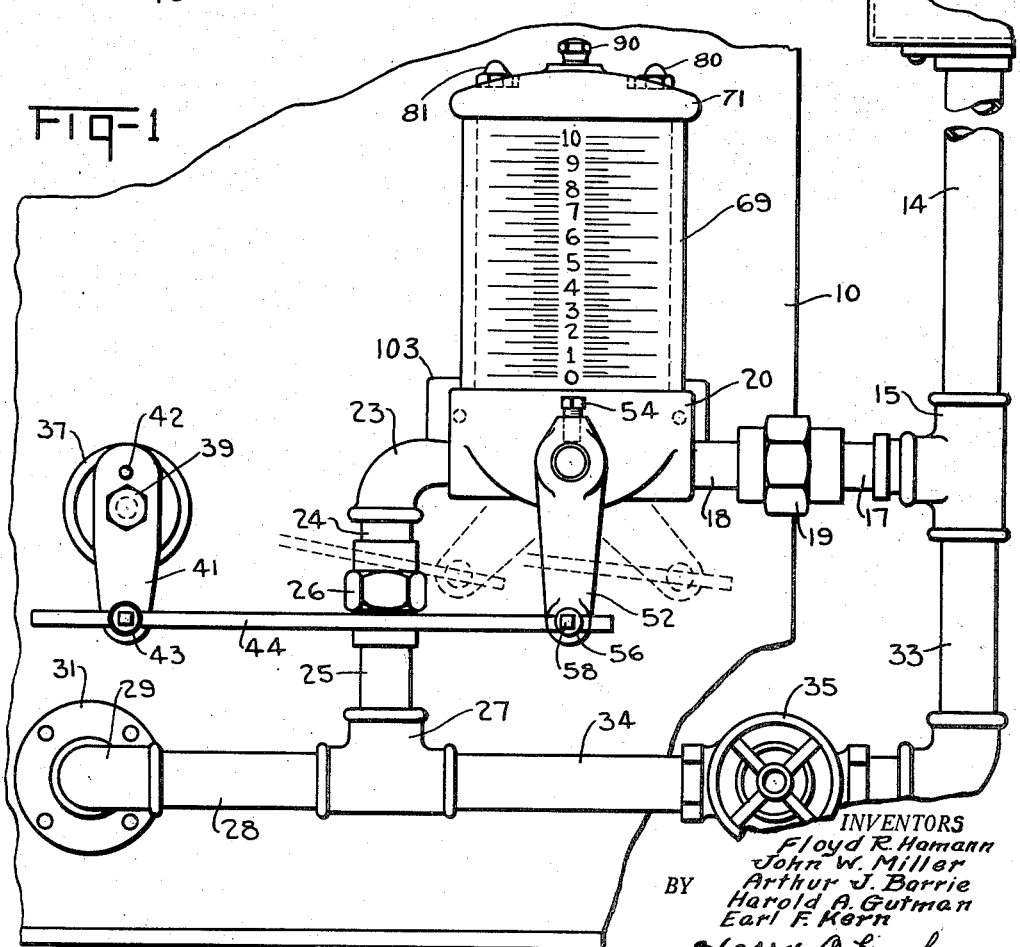
INVENTORS
Floyd R. Hamann
John W. Miller
Arthur J. Borrie
Harold A. Gutman
Earl F. Kern
BY Harry O. Ernsberger
Atty.

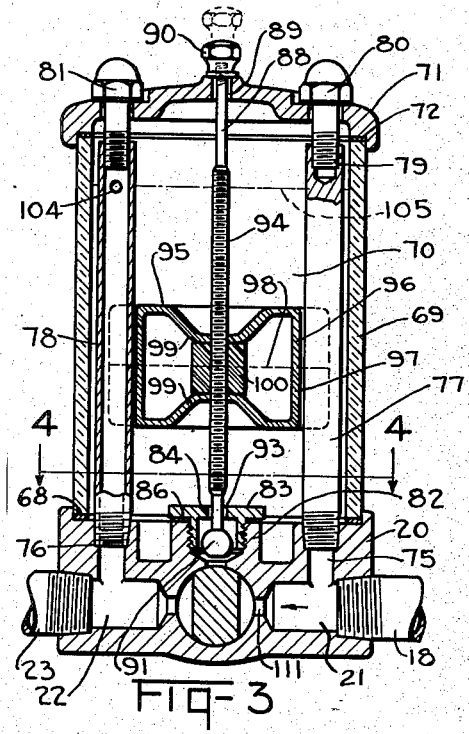
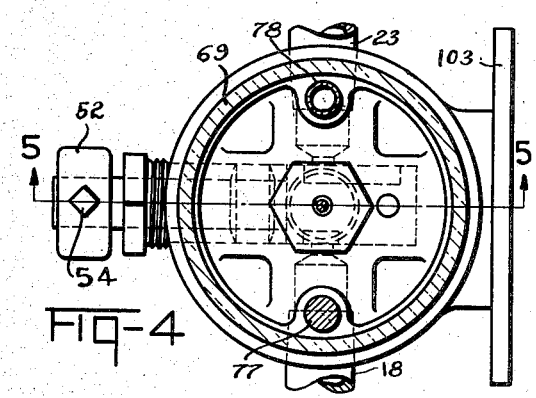
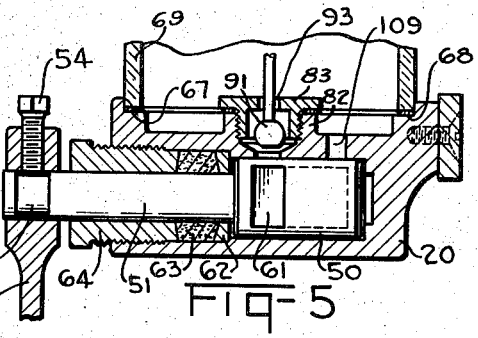
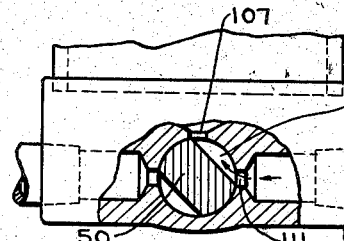
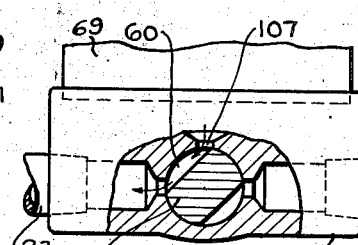
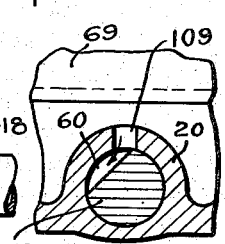
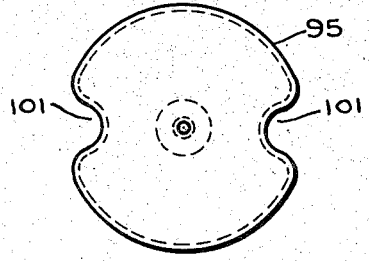
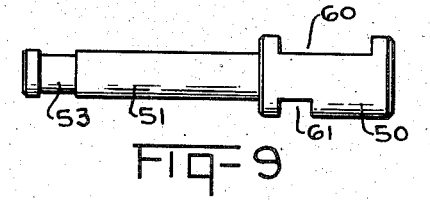

Patented Aug. 14, 1951

2,563,930

UNITED STATES PATENT OFFICE 2,563,930

LIQUID MEASURING AND DISPENSING DEVICE

Floyd R. Hamann, Sylvania, and John W. Miller, Arthur J. Barrie, Harold A. Gutman, and Earl F. Kern, Toledo, Ohio, assignors to Miami Industries Inc., Toledo, Ohio, a corporation of Ohio Application February 17, 1948, Serial No. 8,992

9 Claims. (Cl. 222—67)

This invention relates to measuring and dispensing devices and more particularly to devices for measuring and dispensing liquids.

In the preparation or maintenance of cleansing or detergent solutions and particularly those of a character utilized in bottle or container washing apparatus and the like, it is imperative that the proper proportion of caustic or detergent be maintained in the washing zone. Heretofore it has been the practice for the operator of the washing apparatus to introduce quantities of caustic or detergent to the washing solution whenever he believed that such additional caustic was required. This method of replenishing the caustic ingredient in a solution has not been reliable and the washing solution very often contained an insufficient or excessive amount of caustic. Many States have regulations relating to the washing and sterilization of containers which specify the amount of caustic in container washing solutions. In order to comply with such regulations an operator of a washing machine very often maintains an excessive proportion of caustic which has resulted not only in the utilization of unnecessary amounts of caustic but increases the expense of container washing operations.

The present invention embraces the provision of an apparatus for delivering measured quantities of the caustic or detergent constituent into the washing solution at predetermined regular intervals whereby a desired composition of washing or cleaning solution is maintained.

Another object of the invention resides in the provision of liquid measuring means in which the liquid entering a measuring receptacle is caused to act upon a float associated with valve means for interrupting the flow of liquid to predetermine the quantity of liquid admitted to the measuring receptacle in combination with means for subsequently diverting the measured quantity of liquid into another receptacle.

Another object of the invention resides in the provision of means for determining the measured quantities of liquid for subsequent disposition into another receptacle and in which the liquid measuring means is unaffected by variations in the liquid head in the reservoir from which the liquid to be measured is obtained.

Another object of the invention resides in the provision of a unitary device usable with industrial container washing apparatus or the like for periodically delivering measured quantities of the liquid to the apparatus in which a mechanical means is utilized for admitting liquid from a reservoir to the measuring means and from the latter to the washing apparatus, the unitary device being arranged to be secured to the washing receptacle or tank or supported by the piping for conveying the liquid to and from the measuring device.

Another object of the invention resides in a visual liquid measuring receptacle in which a float control valve is adjustably arranged to regulate the quantities of fluid intermittently introduced into and extruded from the measuring receptacle.

A further object of the invention resides in the provision of a liquid overflow means associated with a measuring chamber whereby any overflow is delivered to a receptacle wherein the liquid is to be utilized.

Another object of the invention is the provision of a float means, the position of which is adapted to determine the quantity of liquid entering a measuring chamber in which the float means is fabricated of a material which is not affected by the action of the caustic or detergent solution.

Another object of the invention resides in the provision of a valved by-pass or channel in communication with the fluid delivery outlet of the measuring chamber whereby upon initiation of a fluid delivery cycle, the upwardly acting force of the liquid upon the float is dissipated by means of the by-pass to enhance the extrusion or delivery of the liquid from the measuring chamber to the outlet.

Further objects and advantages are within the scope of the invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view illustrating the apparatus of our invention associated with a container washing tank;

Figure 2 is a top plan view of the apparatus illustrated in Figure 1;

Figure 3 is a vertical sectional view taken substantially on the line 3—3 of Figure 2;

Figure 4 is a horizontal sectional view taken substantially on the line 4—4 of Figure 3;

Figure 5 is a vertical sectional view taken substantially on the line 5—5 of Figure 4;

Figure 6 is an elevational view of a portion of the apparatus, certain parts being shown in section, illustrating the position of the valve to initiate flow of liquid from the reservoir into the measuring device;

Figure 7 is a view similar to Figure 6 illustrating the valve in position to facilitate flow of liquid from the measuring device;

Figure 8 is a fragmentary sectional view illustrating the control valve in relation to a liquid by-pass during the fluid delivery from the measuring device;

Figure 9 is a view illustrating a valve element forming a part of the invention, and Figure 10 is a plan view of a float means forming a part of the invention.

While we have illustrated the arrangement of our invention as utilized for measuring and delivering predetermined or measured quantities of caustic solution to a washing apparatus, it is to be understood that we contemplate the utilization of the measuring device of the instant invention in any place wherever the same may be found to have utility.

Referring to the drawings in detail, the device of our invention is shown in connection with an industrial washer or receptacle 10 of a type used for washing or cleaning bottles, beverage containers or the like. In a washing apparatus of the character with which our device has particular utility, the containers (not shown) are moved through a washing receptacle or tank 10 containing a saponacious or caustic solution by mechanical means (not shown) the containers, after the completion of washing operations, being conveyed to rinsing receptacles or tanks (not shown). During the washing operations, certain amounts of the caustic or detergent solution in the washing receptacle or tank 10 adhere to the containers as they pass from the washer and into the rinsing receptacles, whereby the cleaning or detergent solution in the washer is being continuously depleted. The operator adds water to maintain proper level of liquid in the washer but caustic must be also added to maintain the proper washing solution. Our device adds predetermined amounts of concentrated caustic solution to the washing tank to replace that which adheres to the containers. The concentrated caustic solution usually employed is sodium hydroxide and water, and in some instances a commercial water softener may be added. The concentrated solution is contained in a reservoir or receptacle 12 disposed above the liquid measuring device. Secured to the bottom wall of the reservoir 12 is a pipe or tube 14 connected with a body member 20 of the measuring device by means of a T-shaped fitting 15, tubes or pipes 17 and 18 and a union or coupling 19. The tube 18 is threaded into a passage 21 formed in member 20 as shown in Figure 3. The member 20 is provided with an outlet passage 22 into which is threaded an outlet fitting or pipe 23 which is connected by means of pipes 24, 25 and a union or coupling member 26 with a T-shaped fitting 27. One branch of the fitting 27 is connected by means of the pipe 28, fitting 29 and pipe 30 to a flanged fitting 31 secured to a wall of the receptacle 10 as shown in Figures 1 and 2. The fitting 15 is also connected by tubes 33, 34 and a manually operated valve 35 with the fitting 27 so that in event it is desired, the operator of the washing apparatus may admit the concentrated caustic solution from reservoir 12 directly to the receptacle 10, this arrangement providing an effective means for establishing the initial ratio of caustic in the washing solution contained in the receptacle 10.

Industrial washing equipment of the character with which our invention has particular utility is provided with mechanically operated means for conveying bottles or containers into and out of the washing tank 10, and as a part of such mechanism a shaft 37 driven from a suitable source of power (not shown) is arranged for rotation at a comparatively slow speed during the operation of a washing machine. Secured to the shaft 37 is a crank arm 41 retained thereto by means of a nut 39 and a dowel pin 42. The extremity of the arm 41 is provided with a bore within which is revolubly contained a member or stub shaft 43 held in place by a cotter key 40, the shaft having a transverse opening therethrough adapted to accommodate a connecting bar or rod 44 as a motion transmitting medium to actuate a liquid flow control valve mechanism forming a part of the fluid measuring device of our invention. The rod 44 is held in stub shaft 43 by means of a set screw 49.

The base member 20 is provided with a chamber within which is disposed a generally cylindrically shaped valve member 50, the valve being formed with a tenon or extension 51 to the extremity of which is secured an arm 52. The tenon 51 is provided with a peripheral recess 53 adapted to accommodate the extremity of a set screw 54 threaded into an opening in the arm 52 and which may be drawn up into the recess in engagement with the shaft 51 to securely fasten the arm thereto. The end portion of arm 52 is provided with a bore adapted to accommodate a stub shaft 56 similar in construction to the stub shaft 43 and which is revolubly mounted in the bore contained in the arm 52. The bar 44 extends through a transverse opening in the stub shaft 56 and is secured to the shaft by means of a set screw 58.

The valve 50 is provided with diametrically opposed slots or kerfs 60 and 61 providing channels or passages to direct the flow of liquid in a manner to be hereinafter explained. Surrounding the shaft 51 of the valve construction is a suitable stuffing gland or sealing means which includes an abutment collar 62, sealing material 63, and a packing nut 64, the latter being threaded into the base or body member 20 and adjusted to exert proper pressure upon the shaft sealing material 63 to prevent leakage of liquid along the shaft.

The body member 20 is formed with a circular shoulder or ledge 67 supporting a gasket 68. Disposed above the gasket 68 is a hollow cylinder 69 preferably of glass or other suitable material which will not be affected by the caustic solution. The cylinder 69 provides a liquid measuring chamber 70 adapted to receive the concentrated caustic solution. Mounted upon the upper end of the cylinder 69 is a cap or closure member 71, a gasket 72 interposed between the closure 71 and the cylinder 70. The body portion 20 is provided with two vertically arranged openings 75 and 76 which are threaded to respectively accommodate a rod 77 and tube 78 as shown in Figure 3. The upper end of the rod 77 has a threaded bore 79 adapted to accommodate a securing or cap screw 80, and the upper portion of tube 78 is interiorly threaded to accommodate the cap screw 81. Thus the cylinder 69 and the cap or closure 71 are held in place with respect to the body portion 20 by means of the rod 77, tube 78 and the cap screws 80 and 81.

Formed in the body member 20, above the valve 50 is a hollow boss 82 threaded to accommodate a member 83 having an inwardly extending ledge 84 which forms a valve seat. A gasket 86 is interposed between a flange of the member 83 and the boss 82 in order to provide a liquid tight joint. Centrally disposed in the measuring cylinder 69 is a vertically extending shaft 88, the upper end of the shaft extending through an opening 89 in the cap 71 and is provided with a finger piece or knob 90 which is threaded or otherwise secured to the shaft 88. Mounted upon the lower end of the shaft 88 is a ball member or valve 91 which is formed of suitable material resistant to deleterious effect of the caustic solution, as for example, Monel metal, that is a metal composed of nickel, iron and copper. Upon upward movement of the shaft 88, the ball shaped valve 91 is adapted to engage the valve seat formed by the ledge 84 to close a channel or passage 93 formed in the fitting 83 which accommodates the shaft 88. The intermediate portion of shaft 88 is threaded as at 94 and mounted upon the shaft is a hollow float means 95 formed of a plasticized polymethyl methacrylate resin, the plasticizer being dibutyl phthalate or other suitable plasticizing compositions. We have found that a plastic of this character is uneffected by the caustic solutions used in commercial practice. The float member 95 is preferably fashioned in two portions 96 and 97 which are hermetically sealed during manufacture along the juncture indicated at 98. The central portions 99 of the float are spaced to accommodate a block 100 formed of the same or similar material from which the float is made, the block being hermetically sealed to the portions 99 of the members constituting the body of the float. The block 100 is bored and threaded so as to be received upon the threaded portion 94 of rod 88. A plan view of the configuration of the float 95 is shown in Figure 10. As will be noted from this figure, the float is formed with diametrically opposed depressions or indentations 101 for the purpose of accommodating the rod 77 and the tube 78. The portions of the float adjacent the depressions 101 are adapted to contact the rod 77 and tube 78 to prevent relative rotation of the float when the shaft 88 is rotated. Thus the relative vertical position of the float 95 on shaft 88 may be adjusted by the operator grasping the knob 90 and rotating the shaft 88 so that the threaded portion thereof will elevate or lower the float.

An overflow means is provided in our device so that in event the ball 91 does not seat properly, the overflow of caustic solution will be conveyed to the washing tank. To this end an opening 104 is provided in the wall of tube 78 near the upper end of the tube so that if for any reason the liquid in the measuring chamber 70 reaches the level indicated by the dotted line 105, the liquid will overflow through opening 104 and pass downwardly through the interior of tube 78 through the opening of tube 76 and into the outlet passage of tubes 22 and 23 so that the liquid will be conveyed into the washing tank.

When the mechanically actuated valve 50 has been moved to a position such that caustic solution may flow from the reservoir 12, through the channel 61 upward through opening 107 formed in the body 20 past the ball valve 91 and into the float chamber 70, the flow will continue until the buoyancy of the liquid has elevated the float 95 to bring the ball valve 91 into engagement with the valve seat 84. The opening 89 in the closure 71 is larger than the shaft 88 to permit the egress and ingress of air to the chamber to equalize the pressure therein and facilitate flow of liquid into and out of the chamber. When the valve member 50 is moved to the position shown in Figure 7 for discharge of the solution from the measuring chamber through the outlet tube, it has been found that the buoyancy or upwardly acting pressure of the liquid in the measuring chamber exerting an upward force upon the float 95 is sometimes sufficient to hold the ball valve 91 against its seat and retain the liquid in the measuring chamber when the valve 50 is moved to liquid discharge position. To eliminate this condition, we have provided a by-pass or supplemental channel 109 which establishes communication with the slot or channel 60 in the valve 50 so that when the valve 50 is moved to liquid discharge position as shown in Figure 7, a by-pass outlet for fluid from the measuring chamber is established through the channels 109 and 60 to the outlet tube 23. As soon as some of the liquid flows through this by-pass, the float 95 is relieved of upwardly directed fluid pressure so that the fluid is lowered and the ball valve 91 moves away from its seat 84 so that fluid may flow past the ball valve from the measuring chamber to the discharge outlet. Furthermore, the by-pass arrangement in conjunction with the fluid passage adjacent the ball valve 91 facilitates rapid discharge of liquid from the chamber 70.

The measuring device is preferably supported upon the washing tank 10 by means of bolts 102 passing through openings in a flange or bracket 103 formed on the body member 20. The device may, however, be supported solely upon the piping if desired.

The normal operation of the arrangement of our invention is as follows: Assuming that the apparatus contained in the washing tank or receptacle 10 is in operation so that the shaft 37 is being rotated at a comparatively low rate of speed to rotate the crank arm 41 causing a slow oscillatory movement of the arm 52 and the valve 50 through the medium of the connecting rod 44. When the arm 52 is moved to the right hand position as indicated in dotted lines in Figure 1, the valve 50 is moved to the position shown in Figure 6, and caustic solution contained within the reservoir 12 flows downwardly by gravity through the tube 14, fitting 15 and tubes 17 and 18, opening 111, channel 61 in the valve 50 through opening 107, past the ball valve 91 through opening 93 and into the measuring chamber 70. The liquid continues to flow into the chamber 70 until the float 95, which has been previously adjusted by manipulation of the knob 90 to a position determinative of the amount of liquid to be introduced into the measuring chamber at any one filling, is elevated to close opening 93 through the engagement of ball valve 91 with the seat 84.

During the filling cycle the arm 52 and valve 50 are slowly moved by rotation of the shaft 37 until the arm 52 reaches its left hand position as shown in dotted lines in Figure 1 and the valve 50 moved to the position shown in Figure 7. During the period when the valve 50 is approaching the position shown in Figure 7, the recess or channel 60 therein is gradually moved into registration with the by-pass 109 so that fluid begins to flow out of the measuring chamber 70 through the recess 60 and outlet 23 into the receptacle 10 by way of the tubes 24, 25, 28 and 29. As soon as the fluid pressure has been thus relieved on the float 95, the float is lowered and the ball 91 moves away from its seat 84 to re-establish communication through opening 93 past the ball valve 91, opening 107 and recess 60 in the valve 50 to discharge liquid from the measuring chamber in addition to that flowing through the by-pass 109. This arrangement provides for a rapid discharge of liquid from the measuring chamber through two channels to the outlet. Continued rotation of shaft 39 repeats the cycle, moving the arm 52 and valve member 50 to a position wherein the concentrated caustic solution in reservoir 12 again flows into the measuring chamber 70. If for any reason an excess of fluid should flow into the measuring chamber, any excess or overflow passes through the opening 104 downwardly through the hollow interior of tube 78 and discharged into the washing tank 10.

It should be noted that the openings 75 and 76 are respectively in communication with the inlet passage 21 and the outlet passage 22, but communication between opening 75 and the measuring chamber 70 is obstructed by the presence of the solid rod 77. In the event that it is desired to reverse the position of the measuring unit dependent upon the form of washing equipment with which the device is to be used, the rod 77 and tube 78 may be reversed, the passage 22 connected with the reservoir 12 and the passage 21 then becomes the discharge outlet from the measuring chamber. By adjusting the position of the valve 50 with respect to the arm 52, the valve may be moved through a radial distance of 180 degrees, in which position the caustic solution will then flow into the measuring chamber in a reverse direction as far as the inlet and outlet tubes are concerned. The overflow tube 78 and securing rod 77 are also reversed so that overflow will be discharged through the passages 75 and 21 as the latter becomes the outlet from the measuring chamber.

In the event that more or less caustic solution is required for delivery to the washing receptacle 10, the operator may adjust the amount of fluid entering the measuring chamber 70 at each filling by adjusting the knob 90 to rotate the shaft 88, thus elevating or lowering the float 95 upon the threaded portion 94, the extent of movement being dependent upon the number of rotations imparted to the shaft 88.

It is apparent that, within the scope of the invention, modifications and different arrangements may be made other than is herein disclosed, and the present disclosure is illustrative merely, the invention comprehending all variations thereof.

What we claim is:

1. A liquid measuring and dispensing device, in combination a chamber; a channel communicating with said chamber through which liquid may flow into and out of said chamber; a valve in said channel; a float disposed in said chamber and connected with said valve; means accessible exteriorly of the chamber for adjusting the relative position of said float to predetermine quantities of liquid admitted to said chamber; inlet and outlet passages adapted for communication with said channel; a second valve for controlling said inlet and outlet passages; and a by-pass channel in communication with said chamber and arranged to be opened and closed by said second mentioned valve.

2. A liquid measuring device, in combination a chamber; a passage communicating with said chamber through which liquid may flow into and out of said chamber; a valve in said passage; a float disposed in said chamber and connected with said valves; means accessible exteriorly of the chamber for adjusting the relative position of said float to predetermine quantities of liquid admitted to said chamber; a second valve having liquid conveying recesses formed therein; a by-pass channel in communication with said chamber and arranged to be opened and closed by said second mentioned valve; the recesses in said second mentioned valve being arranged to direct the flow of liquid into and out of said chamber when said valve is moved to different positions.

3. A liquid measuring device, in combination a chamber; a passage communicating with said chamber having inlet and outlet ducts through which liquid may flow into and out of said chamber; a valve in said passage; a float disposed in said chamber and connected with said valve; means accessible exteriorly of the chamber for adjusting the relative position of said float to predetermine quantities of liquid admitted to said chamber; a second valve having liquid conveying recesses formed therein; said second mentioned valve being arranged to be actuated by mechanical means; a by-pass channel in communication with said chamber and arranged to be opened and closed by said second mentioned valve; the recesses in said second mentioned valve being arranged to direct the flow of liquid into and out of said chamber; and an overflow port in communication with said chamber and the outlet duct of said passage.

4. A liquid measuring device, in combination, a measuring chamber formed with a base member and a hollow cylindrical member; valve means contained in said base member for controlling the flow of liquid into and away from the measuring chamber; float controlled means for automatically interrupting flow of liquid into said chamber for predetermining the quantity of liquid admitted thereto; a closure for said cylindrical member; means including a tubular member for securing said closure in position; said tubular member having a port in communication with said chamber forming a liquid overflow for said chamber.

5. A liquid measuring device, in combination a measuring chamber formed of a base member and a light transmitting cylindrical member; valve means contained in said base member for controlling the flow of liquid into and away from the measuring chamber; float controlled means for automatically interrupting flow of liquid into said chamber for predetermining the quantity of liquid admitted thereto; means for adjusting the float controlled means to vary the quantity of liquid admitted to said measuring chamber; a closure for said cylindrical member; means including a tubular member for securing said closure in position; said tubular member having a port in communication with said chamber forming a liquid overflow for said chamber.

6. A liquid measuring device, in combination, a liquid receiving receptacle; a base member supporting said receptacle; valve compartments formed in said member; a float in said receptacle; a ball-shaped valve in one of said compartments; adjustable means connecting said float with said ball-shaped valve and accessible exteriorly of the receptacle for adjusting the relative position of the float with respect to the valve; a cylindrically shaped valve member in another of said valve compartments and having passages formed therein; one of said passages being arranged to convey liquid into said receptacle; another of said passages arranged to convey liquid away from said receptacle; a by-pass outlet channel in communication with the receptacle; said channel being controlled by said cylindrically shaped valve.

7. A liquid measuring device, in combination, a liquid receiving receptacle including a base member; valve chambers formed in said member; a float in said receptacle; a ball valve in one of said chambers; adjustable means accessible exteriorly of said receptacle connecting said float with said ball valve for adjusting the relative position of the float with respect to the ball valve; a cylindrically shaped valve member in another of said valve chambers and having passages formed therein; one of said passages being arranged to convey liquid into said receptacle; another of said passages arranged to convey liquid away from said receptacle; a by-pass channel arranged between said receptacle and one of said valve chambers for conveying liquid away from the receptacle; said channel being controlled by said cylindrically shaped valve.

8. A liquid measuring and dispensing device including a base member; a hollow cylindrically shaped element mounted on said base member and forming a liquid receiving chamber; a pair of spaced vertically extending rods mounted upon said base member; a cover for said chamber secured to said rods; a float in said chamber, said rods forming guiding means for said float; a threaded element in said chamber having a valve member at its lower end; said valve member controlling the flow of liquid into said chamber; said threaded element having threaded connection with said float and having means extending exteriorly of the cover member for rotating said threaded element to adjust the position of the float with respect to said threaded member, one of said rods being formed with a passage forming an overflow channel for the chamber.

9. A liquid measuring and dispensing device including a base member; a substantially transparent tubular member mounted on the base member and forming a liquid receiving receptacle; a pair of spaced rods mounted on said base member and extending through the tubular member; a cover for the tubular member secured to said rods; a float in said chamber adapted to be guided by said spaced rods; one of said rods being formed with a passage providing an overflow channel for the receptacle; a rotatable threaded member having threaded connection with said float for adjusting the position of the float with respect to the threaded member; a chamber formed in the base member; fluid inlet and outlet passages in said base member; valve means in the base member for controlling fluid flow into and out of the base member; a passage between the liquid receiving receptacle and the chamber in said base member; and valve means connected to said threaded member for controlling liquid flow from the chamber in the base member to the receptacle.

FLOYD R. HAMANN.
JOHN W. MILLER.
ARTHUR J. BARRIE.
HAROLD A. GUTMAN.
EARL F. KERN.

REFERENCES CITED

The following references are of record in the file of this patent:

UNITED STATES PATENTS

| Number | Name | Date |
|---|---|---|
| 707,532 | Adams | Aug. 26, 1902 |
| 1,242,831 | MacKenzie et al. | Oct. 9, 1917 |
| 1,366,862 | Berry | Jan. 25, 1921 |
| 1,685,409 | Oakley | Sept. 25, 1928 |
| 1,721,923 | Rosendahl | July 23, 1929 |
| 2,316,000 | James | Apr. 6, 1943 |